(12) United States Patent
Kasselman et al.

(10) Patent No.: US 6,772,674 B2
(45) Date of Patent: Aug. 10, 2004

(54) TIE ROD APPARATUS AND METHOD FOR ASSEMBLING A VACUUM BOOSTER

(75) Inventors: Michael A. Kasselman, West Chester, OH (US); Michel J. Vermoesen, Miamisburg, OH (US); Patrick T. MacLellan, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 93 days.

(21) Appl. No.: 10/292,733

(22) Filed: Nov. 12, 2002

(65) Prior Publication Data

US 2004/0089149 A1 May 13, 2004

(51) Int. Cl.[7] ............................................. F01B 11/02
(52) U.S. Cl. ..................................... 92/169.3; 91/379 R
(58) Field of Search ......................... 92/169.3; 91/376 R

(56) References Cited

U.S. PATENT DOCUMENTS

| | | | |
|---|---|---|---|
| 4,418,611 A | * 12/1983 | Tateoka et al. | ............ 92/169.3 |
| 5,487,327 A | 1/1996 | Schluter et al. | |
| 5,765,468 A | * 6/1998 | Gautier et al. | ............. 92/169.3 |
| 6,164,183 A | 12/2000 | Fulks et al. | |
| 6,209,442 B1 | 4/2001 | Haerr et al. | |
| 6,374,721 B1 | 4/2002 | Zehnder, II et al. | |
| 6,637,837 B2 | 10/2003 | Petin et al. | |

FOREIGN PATENT DOCUMENTS

| | | |
|---|---|---|
| DE | 10136379 | 12/2002 |
| EP | 0760319 | 3/1997 |
| WO | 0061416 | 10/2000 |

* cited by examiner

*Primary Examiner*—Edward K. Look
*Assistant Examiner*—Michael Leslie
(74) *Attorney, Agent, or Firm*—Michael D. Smith

(57) ABSTRACT

An apparatus and method are provided for adjusting the axial distance between the front and rear walls of a vacuum booster, from outside of the booster, after the booster has been assembled. The booster includes a housing having a front housing and a rear housing joined together and defining a longitudinal axis of the booster. The front housing defines a front wall of the housing and an inner surface of the front wall. The rear housing defines a rear wall of the housing and includes a captive nut having threads adapted for threaded engagement with a threaded end of a tie rod. The front and rear walls are spaced an axial distance from one another along the longitudinal axis. A tie rod extends axially through the housing and has a first end engaging the rear wall of the housing and a second end engaging the front wall of the housing. The first end of the tie rod has threads for engaging the threads of the captive nut in the rear wall of the housing. The second end of the tie rod has an axially facing surface thereof for applying an axially directed force against the inner surface front wall of the housing. The axial distance of the housing between the front and rear walls of the housing is adjusted by turning the tie rod, to thread the first end of the tie rod farther in or out of the captive nut. The captive nut may include a tube extending axially therefrom along a part of the tie rod into the interior of the housing, through one or more separate fluid chambers within the booster, to provide a sealed passageway precluding leakage between the fluid chambers along the tie rod.

20 Claims, 5 Drawing Sheets

US 6,772,674 B2

TIE ROD APPARATUS AND METHOD FOR ASSEMBLING A VACUUM BOOSTER

TECHNICAL FIELD OF THE INVENTION

This invention relates to vehicle brake systems, and more particularly to vacuum boosters for vehicle brake systems.

BACKGROUND OF THE INVENTION

Vehicles such as automobiles, trucks, buses, and motor homes typically include a dashboard at the front of the passenger compartment, having a power brake booster on the front of the dashboard connected by a push rod to a brake pedal mounted on the rear of the dashboard in the passenger compartment. A brake master cylinder, connected to the braking system, is mounted on the front end of the booster.

As shown in FIG. 1, one commonly used type of brake booster 10, known as a vacuum booster, includes a housing apparatus 12 having a front housing 14 and a rear housing 16, joined together and defining a longitudinal axis 18 of the booster 10. The front housing 14 defines a front wall 20 of the housing 12 and an inner surface 22 of the front wall 20. The rear housing 16 defines a rear wall 24 of the housing 12 and an inner surface 26 of the rear wall 24.

A tie rod 28 extends axially through holes 25, 27 in the front and rear walls 20, 24 respectively of the housing 12. The tie rod 28 has a first end 30 engaging the rear wall 24 of the housing 12, and a second end 32 engaging the front wall 20 of the housing 12. The first end 30 of the tie rod 28 includes an annular flange 36 welded or mechanically fastened to the inner surface 26 of the rear wall 24, and a threaded section 34 extending from the annular flange 36, through the hole 27 in the rear wall 24, for mounting the booster 10 on the front of a vehicle dashboard. The second end 32 of the tie rod 28 extends through the hole 25 in the front wall 20 of the housing 12, and is also threaded to receive a special sealing nut 38 that bears against the inner surface 22 of the front wall 20. The threaded portion of the second end 32 of the tie rod 28 extends outward beyond the front wall 20 of the booster 10, for mounting a brake master cylinder to be actuated by the booster 10.

During assembly of the booster 10, the position of the sealing nut 38 on the threads at the second end of the tie rod 28 is adjusted so that once the front and rear housings 14, 16 are joined together, the sealing nut 38 will be properly positioned for applying an axially directed force against the inner surface 22 of the front wall 20 of the housing 12 to achieve a desired axial distance between the front and rear walls 20, 24 of the housing 12. Setting the front and rear walls 20, 24 at a desired axial distance is required to allow proper pre-load of the front and rear housings 14, 16, and proper spacing between internal components of the booster 10, such as the booster piston 40 and a first and second diaphragm support 42, 44 that move with the piston 40, so that the booster 10 can function properly.

The booster 10, of FIG. 1, is a tandem vacuum brake booster having a primary and a secondary diaphragm 46, 48, and a divider 41 that separate the interior of the housing 12 into primary and secondary vacuum chambers 50, 52, and primary and secondary high-pressure chambers 51, 53. These chambers must be sealed from one another for proper operation of the booster 10. Air tubes 54, adapted for sealing engagement with the primary diaphragm 46 and the divider 41 of the booster 10, provide sealed passageways for the tie rod 28 to pass through the primary vacuum and high pressure chambers 50, 51, without allowing leakage along the tie rod 28 between the primary vacuum and high pressure chambers 50, 51. A sliding seal 55, between the secondary diaphragm 48 and the tie rod 28, precludes leakage around the tie rod 28 between the secondary vacuum and high pressure chambers 52, 53. Maintaining the proper positioning of internal components, such as the air tubes 54, while adjusting the position of the sealing nut 38 on the tie rod 28, further complicates the process of setting the proper distance between the front and rear walls 20, 22 of the booster 10.

What is needed, therefore, is an improved method and apparatus for setting and maintaining the axial distance between the front and rear walls of a booster housing in a vacuum booster of the type described above.

SUMMARY OF THE INVENTION

Our invention provides a tie rod apparatus and method for adjusting the axial distance between the front and rear walls of the booster, from outside of the booster, after the booster has been assembled.

In one form of our invention, a vacuum booster includes a housing having a front housing and a rear housing joined together and defining a longitudinal axis of the booster. The front housing defines a front wall of the housing and an inner surface of the front wall. The rear housing defines a rear wall of the housing and includes a captive nut having threads adapted for threaded engagement with a threaded end of a tie rod. The front and rear walls are spaced an axial distance from one another along the longitudinal axis. A tie rod extends axially through the housing and has a first end engaging the rear wall of the housing and a second end engaging the front wall of the housing. The first end of the tie rod has threads for engaging the threads of the captive nut in the rear wall of the housing. The second end of the tie rod has an axially facing surface thereof for applying an axially directed force against the inner surface front wall of the housing. The axial distance of the housing between the front and rear walls of the housing is adjusted by turning the tie rod, to thread the first end of the tie rod farther in or out of the captive nut.

In another form of our invention the booster includes internal elements thereof axially separating the interior of the housing into fluid chambers sealed from one another, and the captive nut includes a tube extending axially therefrom along a part of the tie rod into the interior of the housing through one or more of the fluid chambers. The tube has a surface adapted for sealing engagement with the internal elements of the booster.

The foregoing and other features and advantages of our invention are apparent from the following detailed description of exemplary embodiments, read in conjunction with the accompanying drawing. The detailed description and drawing are merely illustrative of the invention rather than limiting, the scope of the invention being defined by the appended claims and equivalents thereof.

BRIEF DESCRIPTION OF THE DRAWINGS

In the various drawing FIGS., similar components and features are identified by the same reference numerals.

DETAILED DESCRIPTION

Figure 2:
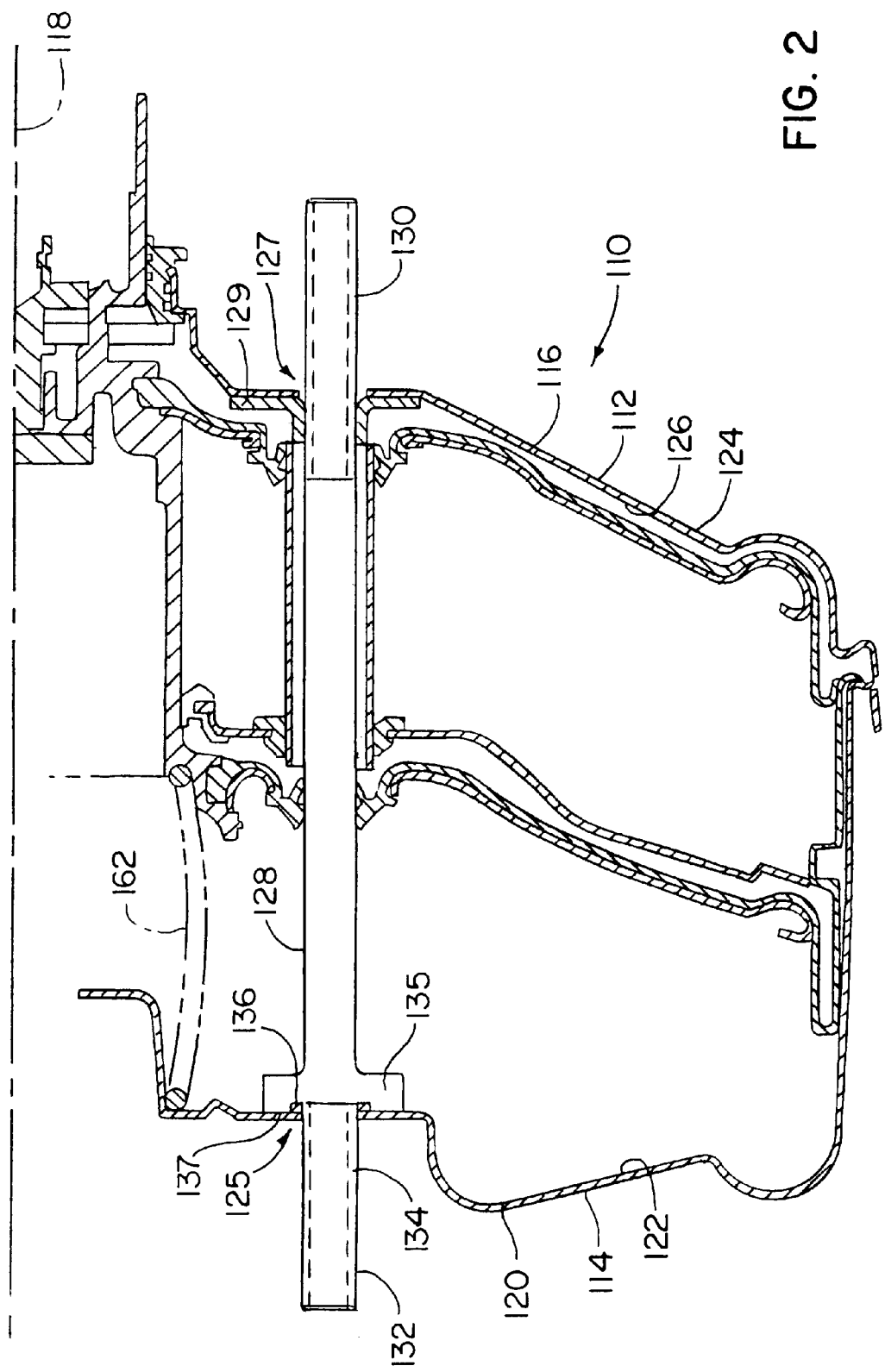
FIG. 2 is a partial cross section of a first exemplary embodiment of our invention having a tie rod including an annular flange bearing against an inner surface of a front wall of the booster housing, and a threaded opposite end of the tie rod engaging a captive nut in a rear wall of the booster housing, so that the axial distance between the front and rear walls may be adjusted after assembly of the booster by turning the tie rod.

FIG. 2 illustrates a first exemplary embodiment of a tandem brake booster 110, according to our invention. The booster 110 includes a housing 112 having a front housing 114 and a rear housing 116 joined together and defining a longitudinal axis 118 of the booster 110. The front housing 114 defines a front wall 120 of the housing 110 and an inner surface 122 of the front wall 120. The rear housing 116 defines a rear wall 124 of the housing 112, and includes one or more captive nuts 129 having threads adapted for threaded engagement with a threaded end of a tie rod 128. The captive nuts 129 are attached by a process such as welding, brazing, adhesive bonding, or other means of mechanically fastening, to an inside surface 126 of the rear wall 124 of the housing 112. The front and rear walls 114, 116 are spaced an axial distance from one another along the longitudinal axis 118.

A tie rod 128 extends axially through the housing 112 and has a first end 130 engaging the rear wall 124 of the housing 112. A second end 132 of the tie rod 128 engages the front wall 114 of the housing 112. The first end 130 of the tie rod 128 has threads for engaging the threads of the captive nut 129 in the rear wall 124 of the housing 112. The second end 132 of the tie rod 128 has an annular flange 135 including an axially facing surface 137 thereof for applying an axially directed force against the inner surface 122 front wall 120 of the housing 112.

Those having skill in the art will recognize that, in contrast to prior boosters of the type described in the Background section above, the axial distance of the housing 112 between the front and rear walls 120, 124 of the housing 112 in a booster 110 according to our invention can be adjusted after the booster 110 is otherwise assembled, by turning the tie rod 128, to thread the first end 130 of the tie rod 128 farther in or out of the captive nut 126. To facilitate turning the tie rod 128, one or both ends 130, 132 of the tie rod may be formed for engagement with a tool, such as a wrench.

The threaded first end 130 of the tie rod 128 extends beyond the rear wall 124 of the booster, through the captive nut 129 and a hole 127 in the rear housing 116, for attaching the booster 110 to a mounting surface such as the front side of the dashboard of a vehicle. The second end 132 of the tie rod 28 includes a threaded portion 134 extending through a hole 125 in the front wall 120 and outward beyond the front wall 120 of the booster 110, for attaching a brake master cylinder to be actuated by the booster 110. A seal 136, in the form of an O-ring or another form of packing, disposed in a trepan groove in the annular flange 135 precludes leakage through the hole 125 around the tie rod 128. A sealant, such as an anaerobic microencapsulated glue is applied to the threads of the first end 130 of the tie rod 128 engaging the tie rod 128 for precluding leakage the threads of the tie rod 128 and the captive nut 129.

Figure 3:
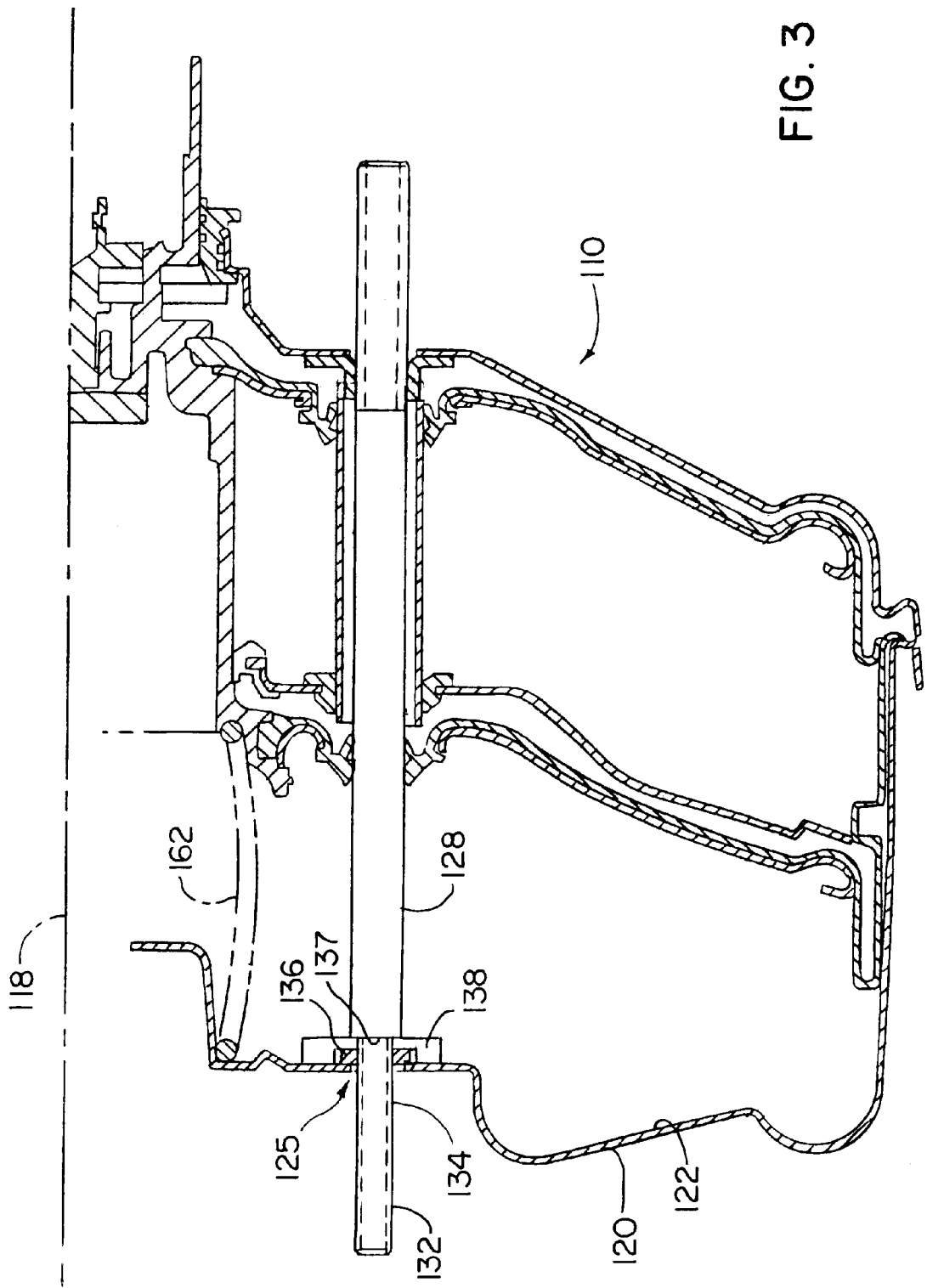
FIG. 3 is a partial cross section of a second exemplary embodiment of our invention having a tie rod including an annular shoulder for clamping a sealing washer against an inner surface of a front wall of the booster housing, and a threaded opposite end of the tie rod engaging a captive nut in a rear wall of the booster housing, so that the axial distance between the front and rear walls may be adjusted after assembly of the booster by turning the tie rod.

FIG. 3 shows a second embodiment of a booster 110, according to our invention. The embodiment of FIG. 3 is identical to the embodiment shown in FIG. 2, except for the configuration of the second end 132 of the tie rod 128, and the manner in which the second end 132 of the tie rod 128 exerts an axial force against the inner surface 122 of the front wall 120 of the booster 110. In the second embodiment shown in FIG. 3, the axially facing surface 137 of the tie rod 128 is provided in the form of a shoulder on the tie rod 128. The shoulder 137 bears against an annular sealing washer 138, clamped between the shoulder 137 and the inside surface 122 of the front wall 120. A seal 136, in the form of an O-ring or other type of packing is disposed in a trepan groove in the annular sealing washer 138 to preclude leakage through the hole 125 around the tie rod 128.

Those having skill in the art will appreciate that by using the shoulder 137 on the tie rod 128, and the annular sealing washer 138, in conjunction with the captive nut 129, manufacturability of the tie rod 128 and booster 110 are significantly improved, resulting in reductions in manufacturing cost and improvements in quality and reliability of the booster 110.

Figure 4:
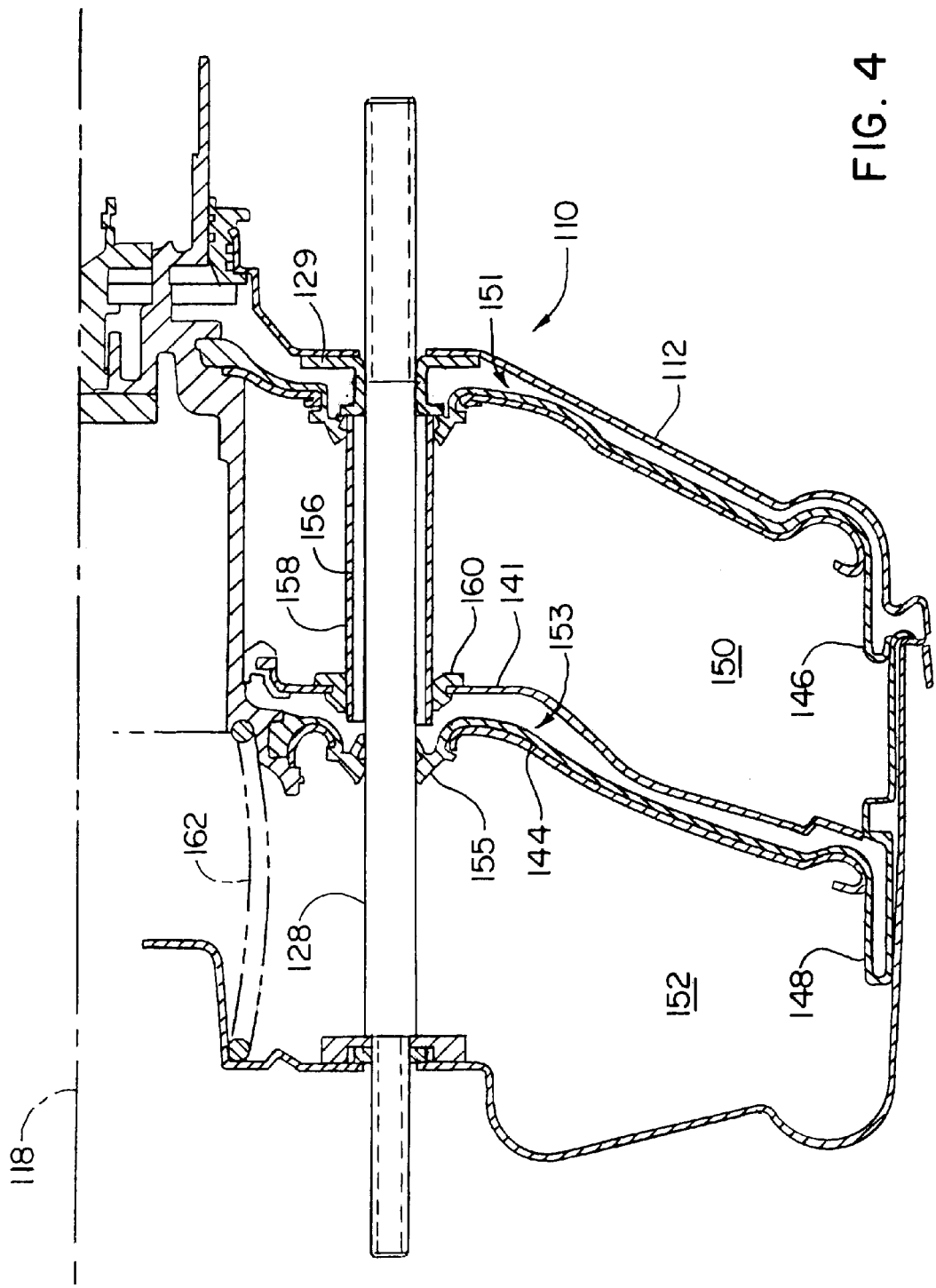
FIG. 4 is a partial cross section of a third exemplary embodiment of our invention, wherein the booster includes internal elements thereof axially separating the interior of the housing into fluid chambers sealed from one another, and the captive nut includes a tube extending axially therefrom along a part of the tie rod into the interior of the housing through one or more of the fluid chambers, with the tube having a surface adapted for sealing engagement with the internal elements of the booster.

FIG. 4 shows a third embodiment of a booster 110, according to our invention. The embodiment of FIG. 4 is identical to the embodiment shown in FIG. 3, except that the captive nut 129 includes a tube 156 extending into the booster 110 and having an outer surface 158 adapted for sealing engagement with internal components of the booster 110, in a manner precluding leakage along the tie rod 128 between internal fluid chambers within the booster 110.

The booster 110, of FIG. 4, is a tandem vacuum brake booster 110 having a primary and a secondary diaphragm 146, 148, and a divider 141 that separate the interior of the housing 112 into primary and secondary vacuum chambers 150, 152, and primary and secondary high-pressure chambers 151, 153. These chambers must be sealed from one another for proper operation of the booster 110.

The outer surface 158 of the tube 156 extending from the captive nut 129 is adapted for sealing engagement with the primary diaphragm 146, and with a seal 160 attached to the divider 141 of the booster 110, to provide a sealed passageway for the tie rod 128 to pass through the primary vacuum and high pressure chambers 150, 151, without allowing leakage along the tie rod 128 between the primary vacuum and high pressure chambers 150, 151. A sliding seal 155, between the secondary diaphragm 148 and the tie rod 128, precludes leakage around the tie rod 128 between the secondary vacuum and high pressure chambers 152, 153.

Figure 1:
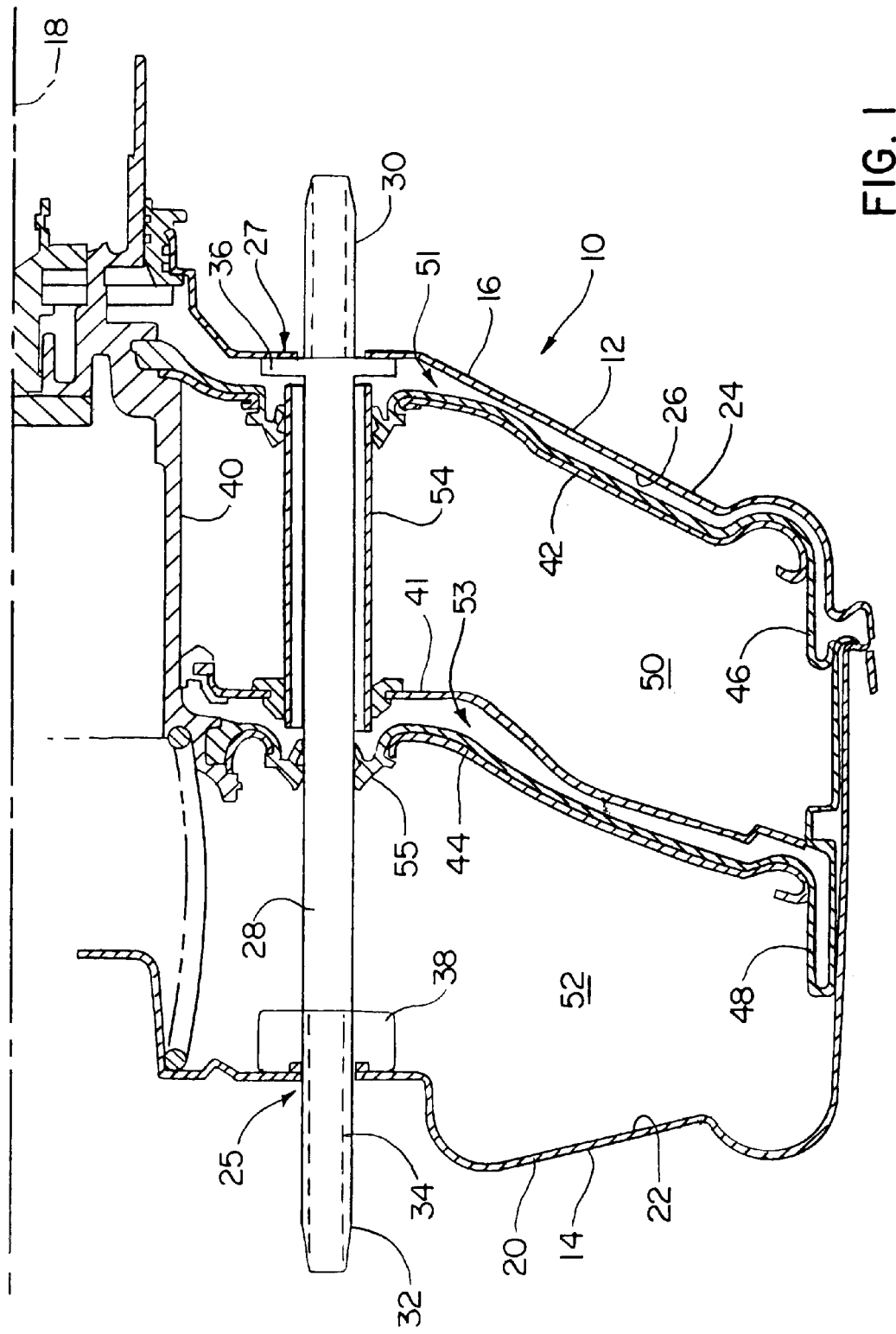
FIG. 1 is a partial cross section of a prior vacuum booster illustrating a prior tie rod apparatus.

Those having skill in the art will appreciate that by making the tube 156 integral with the captive nut 129, as shown in FIG. 4, the separate air tubes 54 used in the prior art booster shown in FIG. 1 can be eliminated to reduce cost and facilitate manufacturability and reliability of the booster 110. It should be noted, however, that aspects of our invention may be utilized in boosters 110 having air tubes 54 separate from the captive nut 129, as shown in the embodiments of FIGS. 2 and 3. It should be further noted that the air tube 156 extending from the captive nut 129 may be used with the tie rod embodiment shown in FIG. 2, or other tie rod embodiments within the scope of the appended claims.

Figure 5:
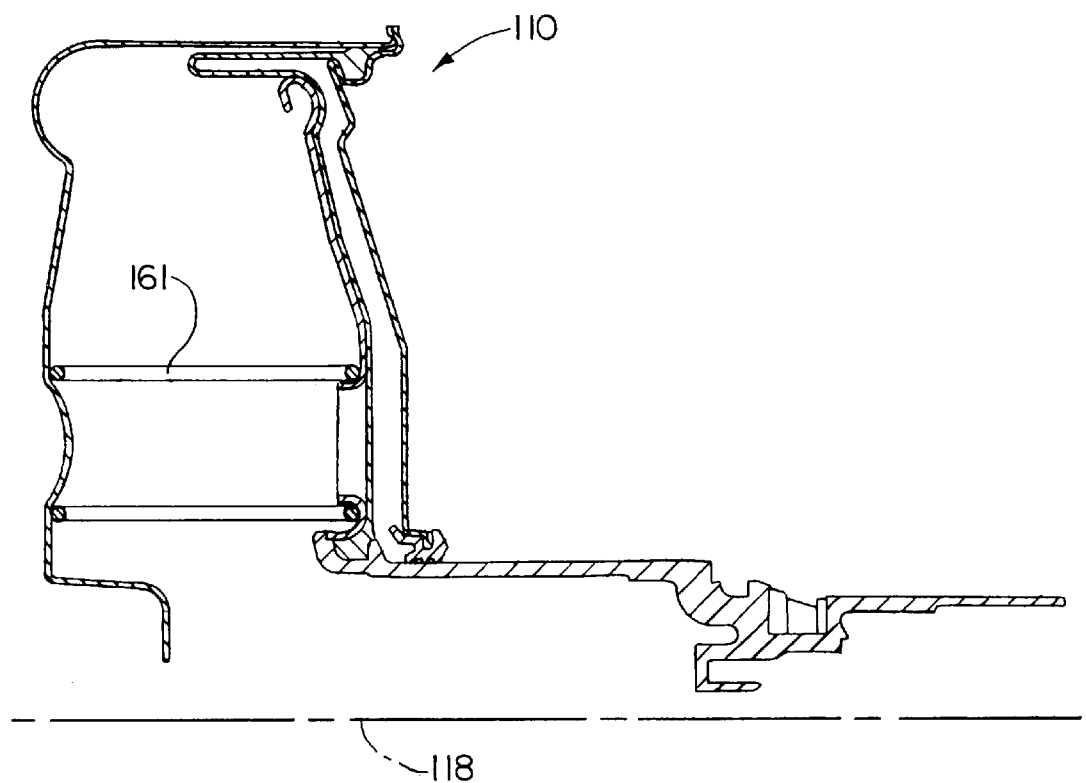
FIG. 5 is a partial cross section of a booster according to our invention having a return spring not located on the booster axis.

While the embodiments of our invention disclosed herein are presently considered to be preferred, various changes and modifications can be made without departing from the spirit and scope of the invention. The various elements and aspects of our invention may also be used independently from one another, or in different combinations than are described above and in the drawing with regard to the exemplary embodiment. For example, in other embodiments of our invention, more than one tie rod 128, and captive nut 129, with or without the tube 156 extending from the captive nut 129, may be utilized. Also, as shown in FIG. 5, our invention may be practiced in boosters 110 having one or more return springs 161 located and acting parallel to the booster axis 118, rather than a more traditional barrel shaped piston return spring 162 disposed about the booster axis 118, as shown in the embodiments of FIGS. 1–4.

The scope of the invention is indicated in the appended claims. We intend that all changes or modifications within the meaning and range of equivalents are embraced by the claims.

We claim:

1. A vacuum booster comprising:
   a housing having a front housing and a rear housing thereof joined together and defining a longitudinal axis of the booster, the front housing defining a front wall of the housing and an inner surface of the front wall, the rear housing defining a rear wall of the housing and including a captive nut having threads adapted for threaded engagement with a threaded end of tie rod, the front and rear walls spaced an axial distance from one another along the longitudinal axis; and
   the tie rod extending axially through the housing and having a first end engaging the rear wall of the housing and a second end engaging the front wall of the housing, the first end of the tie rod having threads for engaging the threads of the captive nut in the rear wall of the housing, the second end of the tie rod having an axially facing surface thereof for applying an axially directed force against the inner surface of the front wall of the housing, whereby the axial distance of the housing between the front and rear walls of the housing is adjustable by turning the tie rod for threading the first end of the tie rod farther in or out of the captive nut.

2. The booster of claim 1 wherein the first end of the tie rod extends through the captive nut and outward from the rear wall of the housing for mounting the booster to a surface.

3. The booster of claim 1 wherein the axial distance of the housing between the front and rear walls of the housing is adjustable from outside of the housing by turning the tie rod for threading the first end of the tie rod farther in or out of the captive nut.

4. The booster of claim 3 wherein the second end of the tie rod extends through the front wall of the housing, and is adapted for engaging a tool for turning the tie rod.

5. The booster of claim 1 wherein the second end of the tie rod includes a flange extending radially outward therefrom defining the axial facing surface of the tie rod.

6. The booster of claim 1 further including a seal disposed about the second end of the tie rod for resisting air flow between the tie rod and the front wall of the housing.

7. The booster of claim 6 further including a washer disposed between the axially facing surface of the second end of the tie rod and the inner surface of the front wall of the housing.

8. The booster of claim 1 wherein:
   the booster includes internal elements thereof axially separating the interior of the housing into fluid chambers sealed from one another; and
   the captive nut includes a tube extending axially therefrom along a part of the tie rod into the interior of the housing through one or more of the fluid chambers, the tube having a surface adapted for sealing engagement with the internal elements of the booster.

9. The booster of claim 1 including a sealant between the first end of the tie rod and the captive nut.

10. A vacuum booster comprising:
    a housing having a front housing and a rear housing thereof joined together and defining a longitudinal axis of the booster, the front housing defining a front wall of the housing and an inner surface of the front wall, the rear housing defining a rear wall of the housing and including a captive nut having threads adapted for threaded engagement with a threaded end of a tie rod, the front and rear walls spaced an axial distance from one another along the longitudinal axis;
    the tie rod extending axially through the housing and having a first end engaging the rear wall of the housing and a second end engaging the front wall of the housing, the first end of the tie rod having threads for engaging the threads of the captive nut in the rear wall of the housing, the second end of the tie rod having an axially facing surface thereof for applying an axially directed force against the inner surface of the front wall of the housing, whereby the axial distance of the housing between the front and rear walls of the housing is adjustable by turning the tie rod for threading the first end of the tie rod farther in or out of the captive nut;
    the booster further including internal elements thereof axially separating the interior of the housing into fluid chambers sealed from one another; and
    the captive nut including a tube extending axially therefrom along a part of the tie rod into the interior of the housing through one or more of the fluid chambers, the tube having a surface adapted for sealing engagement with the internal elements of the booster.

11. The booster of claim 10 wherein the first end of the tie rod extends through the captive nut and outward from the rear wall of the housing for mounting the booster to a surface.

12. The booster of claim 10 wherein the axial distance of the housing between the front and rear walls of the housing is adjustable from outside of the housing by turning the tie rod for threading the first end of the tie rod farther in or out of the captive nut.

13. The booster of claim 12 wherein the second end of the tie rod extends through the front wall of the housing, and is adapted for engaging a tool for turning the tie rod.

14. The booster of claim 10 wherein the second end of the tie rod includes a flange extending radially outward therefrom defining the axial facing surface of the tie rod.

15. The booster of claim 10 further including a seal disposed about the second end of the tie rod for resisting air flow between the tie rod and the front wall of the housing.

16. The booster of claim 15 further including a washer disposed between the axially facing surface of the second end of the tie rod and the inner surface of the front wall of the housing.

17. The booster of claim 10 including a sealant between the first end of the tie rod and the captive nut.

18. A method for manufacturing a vacuum booster, the method comprising:

providing a housing and a tie rod;

the housing having a front housing and a rear housing thereof joined together and defining a longitudinal axis of the booster, the front housing defining a front wall of the housing and an inner surface of the front wall, the rear housing defining a rear wall of the housing and including a captive nut having threads adapted for threaded engagement with a threaded end of a tie rod, the front and rear walls spaced an axial distance from one another along the longitudinal axis;

the tie rod extending axially through the housing and having a first end engaging the rear wall of the housing and a second end engaging the front wall of the housing, the first end of the tie rod having threads for engaging the threads of the captive nut in the rear wall of the housing, the second end of the tie rod having an axially facing surface thereof for applying an axially directed force against the inner surface of the front wall of the housing; and adjusting the axial distance of the housing between the front and rear walls of the housing by turning the tie rod to thread the first end of the tie rod farther in or out of the captive nut.

19. The method of claim 18 further comprising turning the tie rod from outside of the housing, after the booster is otherwise completely assembled.

20. The method of claim 18 further comprising:

configuring the second end of the tie rod to extend through and beyond the front wall of the housing and to engage a tool for turning the tie rod;

engaging the second end of the tie rod with a tool; and turning the tie rod.

* * * * *